United States Patent [19]
Bloodworth et al.

[11] Patent Number: 5,834,524
[45] Date of Patent: Nov. 10, 1998

[54] PROCESS FOR THE PREPARATION OF CROSSLINKED POLYMERS

[75] Inventors: Robert Bloodworth, Köln; Werner Strüver, Leverkusen; Holger Lütjens, Köln; Olaf Halle, Köln; Wolfgang Podszun, Köln, all of Germany

[73] Assignee: Bayer Aktiengesellschaft, Leverkusen, Germany

[21] Appl. No.: 918,617

[22] Filed: Aug. 22, 1997

[30] Foreign Application Priority Data

Aug. 26, 1996 [DE] Germany .................. 196 34 393.3

[51] Int. Cl.⁶ ............................................. C08F 5/24
[52] U.S. Cl. ................... 521/30; 521/25; 521/38; 526/79; 526/87
[58] Field of Search .................. 521/38, 30, 25; 526/79, 87

[56] References Cited

U.S. PATENT DOCUMENTS

| | | |
|---|---|---|
| 2,800,457 | 7/1957 | Green et al. . |
| 2,800,458 | 7/1957 | Green . |
| 3,989,650 | 11/1976 | Lange et al. . |
| 4,181,639 | 1/1980 | Bomer et al. . |
| 4,324,683 | 4/1982 | Lim ......................................... 252/316 |
| 4,427,794 | 1/1984 | Lange et al. . |
| 5,068,255 | 11/1991 | Harris . |

FOREIGN PATENT DOCUMENTS

| | | |
|---|---|---|
| 0051210 | 5/1982 | European Pat. Off. . |
| 0098130 | 1/1984 | European Pat. Off. . |

OTHER PUBLICATIONS

P.W. Morgan, Interfacial Polycondensation a Versatile Method of Polymer Preparation, SPE Journal, pp.485 –495, (1959).

*Primary Examiner*—Fred Zitomer
*Attorney, Agent, or Firm*—Sprung Kramer Schaefer & Briscoe

[57] ABSTRACT

Monodisperse crosslinked polymers prepared by seed/feed polymerization have less tendency to tack when a microencapsulated monodisperse crosslinked polymer has been used as seed. Compared with the seed used, the seed/feed polymer obtained exhibits substantially less broadening of the particle size distribution when microencapsulated seed has been used.

8 Claims, No Drawings

PROCESS FOR THE PREPARATION OF CROSSLINKED POLYMERS

The invention relates to a process for the preparation of crosslinked polymers by swelling of relatively small polymer particles (preferably bead polymer particles) with copolymerizable monomers and polymerization thereof.

Recently, ion exchangers having as uniform a particle size as possible (referred to below as "monodisperse") have become increasingly important because economic advantages can be obtained in many applications owing to the more favourable hydrodynamic properties of an exchanger bed of monodisperse ion exchangers, cf. European Patent Specifications 46,535 and 51,210. The processes of these two stated publications give particles whose average sizes are preprogrammed by the process parameters chosen.

However, it is also possible to increase the particle size of such monodisperse polymers by a so-called seed/feed process, i.e. to swell the polymer ("seed") originally obtained partially with copolymerizable monomers ("feed") and then to polymerize the monomner which has penetrated into the polymer.

According to European Patent Specification 98,130, essentially polymerized crosslinkled seed is initially introduced; the monomer feed for the swelling is carried out under polymerization conditions. A particular difficulty of this process is that the amount of protective colloid used is very critical: excessively large amounts of protective colloid prevent the penetration of the monomer into the seed, while, in the case of excessively small amounts, it may often be impossible to prevent the agglomeration of the beads. Furthermore, the occurrence of a new particle generation of monomer which has not penetrated into the seed frequently presents a problem, which occurs in particular when large amounts of protective colloid are used. Thus, the particle distribution of the bead polymer obtained does not in all cases correspond to the theoretical particle size distribution which can be calculated from the seed but is generally slightly broader ("somewhat wider than the original seed", page 9, line 30 and FIG. 1).

According to European Patent 101,943, the seed is swelled with a mixture of monomer and polymerization initiator, and a monomer without polymerization initiator is then. added under polymerization conditions. This results in ion exchangers having a core-shell structure and improved mechanical properties. However, restrictions similar to those in the case of European Patent Specification 98,130 exist with regard to the tendency to agglomeration, the occurrence of new undesired particle generations and the width of the particle size distribution.

There was therefore a need for a rugged, widely applicable seed/feed process which does not have the disadvantages described.

Surprisingly, it has been found that seed/feed processes are very simple to carry out and do not give agglomerated bead polymers having a particle size distribution which is an exact magnified image of the seed used if a microencapsulated polymer is used as the seed.

It was found that, under the conditions of the present invention, the added mixture can penetrate unhindered through the microencapsulation into the initially introduced microencapsulated polymer and remains in the seed during the subsequent process steps. This unforeseeable situation evidently results in a decisive advantage over conventional seed/feed processes with non-encapsulated seed: in the case of a non-encapsulated seed, with mechanical stress, for example as a result of stirring or conveying with a delivery pump, some of the penetrated monomer mixture can in fact emerge again and cause undesired effects in the subsequent polymerization.

The invention thus relates to a process for the preparation of crosslinked bead polymers via the seed/feed process, characterized in that the seed used is a microencapsulated crosslinked polymer.

The process according to the invention comprises the following steps:

1. Suspension of a microencapsulated crosslinked polymer as seed in a continuous, preferably aqueous phase;
2. Addition of one or more mixtures ("feed") comprising monomer, crosslinking agent and optionally initiator and further additives to the resulting seed suspension before or during the polymerization, the mixture penetrating into the seed;
3. Polymerization of the swollen seed to give bead polymers having a larger particle size at relatively high temperature.

Stage 1

The microencapsulated polymer is the polymerization product of ethylenically unsaturated polymerizable monomer and crosslinking agent. Preferred monomers comprise, for example, styrene, vinyltoluene, ethylstyrene, α-methylstyrene, chlorostyrene, o-chloromethylstyrene, m-chloromethylstyrene, p-chloromethylstyrene, acrylic acid, methacrylic acid, acrylate, methacrylate, acrylonitrile, methacrylonitrile, acrylamide, methacrylamide and mixtures of these compounds. The most preferred monomer is styrene; the most preferred monomer mixtures contain a proportion of styrene. Preferred crosslinking agents comprise in particular compounds having 2 or 3 copolymerizable C=C double bonds per molecule, such as, for example, divinylbenzene, divinyltoluene, trivinylbenzene, divinylnaphthalene, trivinylnaphthalene, diethylene glycol divinyl ether, 1,7-octadiene, 1,5-hexadiene, ethylene glycol dimethacrylate, triethylene glycol dimethacrylate, trimethylolpropane trimethacrylate, allyl methacrylate and methylene-N,N'-bisacrylamide. In many cases, divinylbenzene is a particularly suitable crosslinking agent.

The achievable seed/feed ratio is decisively determined by, among other things, the amount of crosslinking agent in the microencapsulated polymer. The correct amount used depends on the functionality and efficiency of the crosslinking agent used and on the desired seed/feed ratio. In general, this amount used is in the range from 0.1 to 5.0, preferably from 0.1 to 2.0, % by weight, relative to the sum of monomer and crosslinking agent for the microencapsulated polymer.

The mean particle size of the microencapsulated polymer may be from 5 to 500 μm, preferably from 20 to 400 μm, particularly preferably from 100 to 300 μm. The shape of the particle size distribution curve should correspond to that of the desired end product (bead polymer or ion exchanger). Accordingly, a monodisperse microencapsulated polymer is used as seed for the preparation of monodisperse icon exchanger.

The materials known for the intended use, in particular polyesters, polyamides, polyurethanes, polyureas, gelatine and gelatine-containing complex coacervates, as described, for example, in European Patent Specification 46,535, are suitable as encapsulation material. Gelatine and gelatine-containing complex coacervates are particularly suitable for the process according to the invention when low seed/feed ratios are desired. For the purpose of the invention, gelatine-containing complex coacervates are understood as meaning in particular combinations of gelatine and synthetic polyelectrolytes. Suitable synthetic polyelectrolytes are copolymers having incorporated units of, for example, maleic acid, maleic anhydride, acrylic acid, methacrylic acid, acrylamide and methacrylamide. Acrylamide- and methacrylyl-containing copolymers may also be partially hydrolysed. Gelatine-containing capsules may be hardened with customary hardening agents, such as, for example, formaldehyde or glutaraldehyde. The preparation of the microencapsulated polymer is expediently carried out by a procedure in which first the liquid monomers on which the polymer is based are dispersed together with an initiator to give liquid droplets, then microencapsulated by a process known per se and then hardened by polymerization of the monomers to give the microencapsulated polymers.

Such known processes for microencapsulation are, for example:

a) Coacervation

A colloid-rich phase which surrounds the monomer droplet is formed during the coacervation. Hydrophilic colloids, such as gelatine or agar-agar, are suitable for the encapsulation. In order to initiate the coacervation, for example, an aqueous salt solution is added. When gelatine is used as the hydrophilic colloid, alkali metal sulphates, in particular sodium sulphate, have proved useful as salts. The encapsulation by means of coacervation can be carried out in a particularly simple manner by choosing the aqueous solution of a hydrophilic colloid, such as gelatine or agar-agear, as the continuous phase in which the production of the droplets takes place. The preparation of the monomer droplets is carried out at temperatures above the gelling temperature of the colloid.

The formation of the coacervate shell is followed by the solidification thereof by cooling below the gelling temperature. Although the coacervate shell thus produced is stable to shear forces, it is frequently not stable under the polymerization conditions to be used. In order to obtain shells which are stable under the polymerization conditions to be used, the encapsulated particles are subjected to chemical hardening. Processes for chemical hardening, for example the hardening of gelatine with aldehydes, such as formaldehyde, are known (cf. for example U.S. Pat. No. 2,800,458). The chemical hardening of the particles may be carried out continuously or batchwise in the same or another reaction vessel.

b) Complex coacervation

In complex coacervation, a colloid-rich phase forms from two differently charged colloids (polyelectrolytes) and surrounds the monomer droplet. For example, systems comprising gelatine and gum arabic or comprising gelatine and special copolymer mixtures of a copolymer having randomly distributed radicals of acrylarnide and maleic acid or maleic anhydride and a copolymer having randomly distributed radicals, of acrylamide, acrylic acid and maleic acid are suitable for encapsulation by complex coacervation. Such copolymer mixtures are described as complex coacervation components, for example in U.S. Pat. No. 4,181,639. In order to initiate the complex coacervation, for example, the pH of the aqueous phase is adjusted by adding acids, for example in the system gelatine/gum arobic, so that only one of the polyelectrolytes originally having the same charge changes the sign of its charge. After the formation of the complex coacervate shell around the monomer droplet, the temperature is adjusted to below the gelling temperature.

Although the complex coacervate shell thus produced is stable to shear forces, it is frequently not stable under the polymerization conditions to be used. In order to obtain shells which are stable under the polymerization conditions to be used, the encapsulated particles are generally also subjected to chemical hardening. Such processes for chemical hardening, for example for hardening gelatine-containing capsule walls with aldehydes, such as formaldehyde, are known (cf. U.S. Pat. No. 2,800,457).

c) The phase boundary reaction

In the encapsulation by phase boundary reaction, the capsule wall surrounding the monomer droplet is formed by reacting, at the phase boundary droplet/continuous phase with film formation, a component 1 contained in the polymerization mixture with a component 2 added to the continuous phase in the encapsulation region. In practice, this encapsulation by phase boundary reaction is carried out by a procedure in which a component 1 which is miscible with the polymerization mixture but substantially immiscible with the continuous phase is added to the polymerization mixture. After the polymerization mixture has been divided into droplets of equal size, the droplets being stabilized by any desired suspending agent, the swarm of droplets moves into the encapsulation part. Here, a component 2 is fed in. This component 2 is soluble in the continuous phase. A large number of pairs of components $K_1/K_2$ which react at the phase boundary with film formation are known. For example, the halides of polybasic acids, such as sebacoyl chloride, terephthaloyl chloride, phosgene, polyfunctional isocyanates, such as toluene 2,4-diisocyanate, hexamethylene diisocyanate, chlorides of polybasic sulphonic acids, such as 1,3-benzenedisulphonyl chloride, on the one hand, and polyfunctional amines, such as hexamethylenediamine, and polyfunctional hydroxy compounds, such as pyrogallol and bisphenol A, on the other hand, may be mentioned, which react to give polymeric carboxamides and carboxylic esters, to give polyureas and polyurethanes and to give polymeric sulphonamides and sulphonic esters (cf. for example P. G. Morgan, "Interfacial Polycondensation, A Versatile Method of Polymer Preparation", Soc. Plastics Engineers Journal" 15, 485–495). The different reactivity of the various pairs of components $K_1/K_2$ is taken into account by adjusting the residence time in the encapsulation region and by establishing certain temperatures. In some cases, it has proved advantageous concomitantly to use substances which promote the phase boundary reaction, for example bases in polycondensation reactions in which acids are formed. These auxiliaries are preferably added to the continuous phase of the encapsulation region.

European Patent Specification 46 535 describes a process for the preparation of microencapsulated bead polymers of uniform particle size, which are particularly suitable as seed for the present process.

The microencapsulated polymer is suspended in an aqueous phase, the ratio of polymer to water being fairly uncritical. It may be, for example, between 2:1 and 1:20. The use of an auxiliary, for example a surfactant or a protective colloid, is not necessary. Suspension may be effected, for example, with the aid of a normal stirrer.

Stage 2

One or more mixtures of monomer, crosslinking agent, initiator and optionally further additives ("feed") are added to the suspended microencapsulated polymer. Preferred monomers and crosslinking agents are the compounds and mixtures stated above under "Stage 1". The most preferred monomers are styrene and mixtures of styrene and comonomers, such as, for example, acrylonitrile. The monomers should be substantially insoluble in the aqueous phase. Monomers which are partially soluble in water, such as acrylic acid, methacrylic acid and acrylonitrile, are therefore used as a mixture with water-insoluble monomers. It is also possible to reduce the solubility of the monomers in the aqueous phase by salt addition.

The type of crosslinking agent can be chosen in relation to the subsequent functionalization. Thus, for example, acrylate or methacrylate crosslinking agents are less suitable if a cation exchanger is to be prepared by sulphonation, since the ester bond is cleaved under the sulphonation conditions. Divinylbenzene is suitable in many cases, in particular for the preparation of strongly acidic cation exchangers. Conmnercial divlinylbenzene qualities which also contain ethylvinylbenzene in addition to the isomers of divinylbenzene are sufficient for most applications.

Polymerization initiators suitable for the process according to the invention are, for example, peroxy compounds, such as dibenzoyl peroxide, dilauryl peroxide, bis(p-chlorobenzoyl peroxide), dicyclohexyl peroxydicarbonate, tert-butyl peroctoate, 2,5-bis (2-ethylhexanoylperoxy-2,5-dimethylhexane and tert-amylperoxy-2-ethylhexane, and azo compounds, such as 2,2'-azobis(isobutyronitrile) and 2,2'-azobis (2methylisobutyronitrile). The initiators are used in general in amounts from 0.05 to 2.5, preferably from 0.2 to 1.5, % by weight, relative to the sum of monomer and crosslinking agent.

So-called porogens may be used as further additives in the mixture in order to generate a macroporous structure in the polymer. Organic solvents in which the polymer formed has poor solubility or swellability are suitable for this purpose. Hexane, octane, isooctane, isododecane, methyl isobutyl ketone and octanol may be mentioned by way of example.

The weight ratio of initially introduced microencapsulated polymer to added mixture (seed/feed ratio) is in general from 1:1 to 1:20, preferably from 1:2 to 1:10, particularly preferably from 1:2 to 1:8. For a given particle size of the microencapsulated polymer used as seed, it is possible to adjust the particle size of the bead polymer by means of the seed/feed ratio. The maximum amount of feed which is completely taken up by the seed depends to a great extent on the content of crosslinking agent in the seed: with increasing crosslinking, the microencapsulated polymers take up less and less feed mixture.

There are no restrictions at all with regard to the addition of the mixture to the seed Thus, the mixture may be added to the seed suspension before or during the polymerization. It is also possible to add in succession mixtures having different compositions and to allow said mixtures to penetrate into the polymer. A particular morphology, for example a core-shell morphology of the bead polymer, can be established in this way. Thus, for example, a first mixture with initiator and a second mixture without initiator may be added under polymerization conditions.

Stage 3

The polymerzation of the swollen seed to give the bead polymer is carried out as a rule in the presence of one or more protective colloids and optionally of a buffer system. Preferred protective colloids are natural and synthetic water-soluble polymers, such as, for example, gelatine, starch, polyvinyl alcohol, polyvinylpyrrolidone, polyacrylic acid, polymethacrylic acid and copolymers of (meth)acrylic acid and (meth)acrylates. Cellulose derivatives, in particular cellulose ethers and cellulose esters, such as m e t h y l h y d r o x y e t h y l c e l l u l o s e , methylhydroxypropylcellulose, hydroxyethylcellulose or carboxymethylcellulose, are also very suitable. The amount of protective colloids used is in general from 0.02 to 1, preferably from 0.05 to 0.3, % by weight, relative to the aqueous phase.

According to a particular embodiment of the present invention, the polymerization is carried out in the presence of a buffer system. Buffer systems which adjust the pH of the aqueous phase to a value between 14 and 6, preferably between 12 and 8, at the beginning of the polymerization are preferred. Under these conditions, protective colloids having carboxyl groups are present wholly or partly as salts. The action of the protective colloids is advantageously influenced in this manner. Particularly suitable buffer systems contain phosphates or borates. For the purpose of the invention, the terms phosphate and borate also include the condensates of the ortho forms of corresponding acids and salts. The concentration of phosphate or borate in the aqueous phase is from 0.5 to 500, preferably from 2.5 to 100, mmol per liter of aqueous phase.

The stirring speed in the polymerization is not very critical and, in contrast to the conventional suspension polymerization, has no effect on the particle size. Low stirring speeds which are sufficient to keep the microcapsules in suspension and support the removal of the heat of polymerization are preferably used.

The weight ratio of organic phase to aqueous phase in the polymerization is as a rule from 1:0.75 to 1:20, preferably from 1:0.75 to 1:5. This ratio need not necessarily correspond to the ratio which results on addition of mixtures (feed) comprising monomer, crosslinking agent and optionally initiator and further additives to the seed suspension. It is possible to change the aqueous phase before or during the polymerization.

The polymerization temperature depends on the decomposition temperature of the initiator used. It is in general between 50 ° and 150° C., preferably between 55 ° and 100° C. The polymerization takes from 0.5 to a few hours. It has proved useful to use a temperature programmed in which the polymerization is started at low temperature, for example 60° C., and the reaction temperature is increased with progressive conversion in the polymerization. A reliable course of the reaction and high conversion in the polymerization are simultaneously ensured in this manner. With regard to the possibilities for establishing a temperature programmed, there are more degrees of freedom in the process according to the invention than with the use of non-microencapsulated seed, since the critical tacky transition states which usually occur (and which may lead to agglomerations and outsize) are ruled out from the outset by the microencapsulation.

After the polymerization, the polymer can be isolated by conventional methods, for example by filtration or decanting, and can be dried, optionally after one or more washes.

The capsule material is present essentially on the surface of the bead polymer, i.e. the capsule shell "grows" during the seed/feed process. If desired, this material can be removed by an aftertreatment. Gelatine and gelatine-containing complex coacervates can be readily washed off with acids or alkalis.

In most cases, however, it is not necessary specially to wash off the material from the microencapsulation since this is in any case removed under the conditions of the functionalization of the polymer to give ion exchangers. The functionalization of the bead polymer can be carried out by processes known per se.

Anion exchangers can be prepared by haloalkylation—preferably chloromethylation—of the crosslinked polymers and subsequent animation. Processes for haloalkylation and haloalkylating agents are known. A preferred haloalkylating agent is chloromethyl methyl ether. The anion exchangers, in particular weakly and strongly basic ones, can be prepared from the haloalkylated polymers in a known manner. For example, a weakly basic anion exchanger can be prepared by reacting the haloalkylated polymer with ammonia or with a primary amine, such as methylamine or ethylamine, or with a secondary amine, such as dimethylamine, at a temperature of in general from 25° to 150° C., it being necessary for this temperature to be sufficient to allow the animating agent to react with the halogen atom on the α-C atom of the aromatic. Strongly basic anion exchangers can be prepared in a similar manner, the animating agents used being tertiary amines, such as trimethylamine or dimethylisopropanolamine.

Chelate resins can also readily be prepared from the crosslinked polymers. For example, the haloalkylated polymers can be aminated and the aviation products reacted with a suitable compound containing carboxyl groups, such as, for example, chloroacetic acid. The haloalkylated polymers can also be reacted directly with a suitable amino acid, such as, for example, iminodiacetic acid or glycine, or with an aminopyridine, such as, for example, α-picolylamine or N-methyl-α-picolylamine.

Strongly acidic cation exchangers are usually prepared by sulphonation, it being possible for the crosslinked polymer to be swollen in a swelling agent, such as a sulphonation-resistant hydrocarbon (such as, for example, chlorobenzene or tetrachloroethylene) or an aliphatic or aromatic hydrocarbon (such as, for example, toluene or xylene). Preferred sulphonating agents are sulphuric acid, sulphur trioxide and chlorosulphonic acid. The sulphonating agent is generally used in amounts of from 200 to 700% by weight of the polymer to be sulphonated. The sulphonation is preferably carried out at temperatures of from 50° to 200° C.

The ion exchangers which can be prepared from the seed/feed polymers prepared according to the invention exhibit advantageous exchange knetics and high stabilities. In particular, the resistance to an osmotic shock, which frequently presents problems in the case of anion exchangers, is decisively improved.

The stated percentages in the Examples below are each based on weight.

EXAMPLES

Example 1
Preparation of a Bead Polymer 3.59 g of boric acid and 0.99 g of sodium hydroxide are dissolved in 1160 ml of demineralized water in a 4 l glass reactor. 190.5 g of a microencapsulated spherical styrene polymer containing 0.5% of copolymerized divinylbenzene as seed (mean particle size 215 μm) are dispersed in this solution. The microcapsule wall consists of a complex coacervate hardened with formaldehyde and comprising gelatine and an acrylamide/acrylic acid copolymer. Thereafter, a mixture of 845 g of styrene, 48 g of acrylonitrile, 116 g of divinylbenzene (80% strength, commercial mixture of divinylbenzene and ethylbenzene) and 8 g of dibenzoyl peroxide (75% strength, commercial water-moist quality) is metered in within 30 minutes and stirring is then carried out for 1 hour. After this time, 60 ml of 2% strength by weight aqueous methylhydroxypropylcellulose solution are added. The batch is polymerized to completion by increasing the temperature and is cooled, washed over a 32 μm sieve and dried. 1150 g of a bead polymer having a regular shape and a mean particle size of 400 μm are obtained.

Example 2
Preparation of a Bead Polymer 267 g of seed (as described in Example 1, mean particle size 220 μm) and 861 g of styrene, 73 g of divinylbeizene and 7 g of dibenzoyl peroxide are used analogously to Example 1. 1150 g of a bead polymer having a regular shape and a mean particle size of 370μm are obtained.

Example 3
Preparation of a Bead Polymer 9.3 g of disodium hydrogen phosphate dodecahydrate are dissolved in 1100 ml of demineralized water in a 4 l glass reactor. 267 g of seed (as described in Example 1) are dispersed in this solution, a mixture of 116 g of styrene, 24 g of divinylbenene and 9 g of dibenzoyl peroxide is then metered in within 10 minutes and stirring is then carried out for 20 minutes. Thereafter, a mixture of 745 g of styrene and 49 g of divinylbenzene is metered in within 20 minutes and stirring is carried out for a further 30 minutes. After his time, 120 ml of a 2% strength aqueous methylhydroxyethylcellulose solution are added. The batch is polymerized completion by increasing the temperature and is cooled, washed over a 32 μm sieve and dried. 1150 g of a bead polymer having a regular shape and a mean particle size of 370 μm are obtained.

Example 4
Preparation of a Bead Polymer

Instead of boric acid and sodium hydroxide, 9.3 g of disodium hydrogen phosphate dodecahydrate are used analogously to Example 2. 1150 g of a bead polymer having a regular shape and a mean particle size of 370 μm are obtained.

Example 5
Preparation of a Bead Polymer

Instead of the methylhydroxypropylcellulose solution, 120 ml of a 2% strength aqueous methylhydroxyethylcellulose solution are used analogously to Example 2. 1150 g of a bead polymer having a regular shape and a mean particle size of 370 μm are obtained.

Example 6
Preparation of a Strongly Acidic Cation Exchanger 250 g of the bead polymer from Example 1 are stirred into 750 ml of 98% strength sulphuric acid in a 3 l vessel having a plane-ground joint. The mixture is heated to 90° C. within 100 minutes while stirring, then heated to 100° C. within 4 hours and then stirred for 3 hours without further energy supply. Thereafter, the batch is transferred to a glass column and washed with sulphuric acid of decreasing concentration and then with demineralized water (mean particle size 555 μm).

Yield: 4.3 ml of ion exchanger/g of bead polymer; Total capacity: 1.87 eq/l

Example 7
Preparation of a Strongly Acidic Cation Exchanger 750 ml of 98% strength sulphuric acid are heated to 100° C. in a 3 l vessel having a plane-ground joint. At this temperature, 250 g of the bead polymer from Example 1 are added in 10 portions within 4 hours and stirring is carried out for a further 3 hours at this temperature. Thereafer, the batch is transferred to a glass column and washed with sulphuric acid of decreasing concentration and then with demineralized water (mean particle size 555 μm).

Yield: 4.3 ml of ion exchanger/g of bead polymer; Total capacity: 1.87 eq/l

Example 8
Preparation of a Strongly Basic Anion Exchanger

The bead polymer from Example 3 is converted into a strongly basic anion exchanger (mean particle size 550 μm) by amidomethylation with phthalimidomethyl acetate, alkaline hydrolysis and quaternization with chloromethane by the process described in U.S. Pat. No. 3,989,650.

Total capacity: 1.37 eq/l

Example 9
Chloromethylation of a Bead Polymer

A mixture of 1600 g of monochlorodimethyl ether, 165 g of methylal and 5 g of iron(III) chloride is initially introduced into a 3 l sulphonation beaker, and 300 g of bead polymer from Example 2 are then added. The bead polymer is swollen for 30 minutes at room temperature and heated to the reflux temperature (55° C.) in 3 hours. Stirring is then carried out for a further 1.75 hours under reflux. During the reaction time, about 275 g of hydrochloric acid and low-boiling organic substances are expelled. Thereafter, the dark brown reaction suspension is filtered and the chloromethylete is thoroughly washed with a mixture of methylal and methanol and then with methanol. 680 g of methanol-moist, chloromethylated bead polymer are obtained.

Chlorine content: 18.7%

Example 10
Preparation of a Strongly Basic Anion Exchanger 631 ml of the methanol-moist, chloromethylated bead polymer from Example 9 are initially introduced into a 3 l autoclave and the mother liquor is completely sucked off. 909 ml of demineralized water and 298 g of trimethylamine (45% strength) are then added while stirring. The reaction mixture is heated to 70° C., stirred for 3 hours at 70° C. and cooled to room temperature and the liquid is sucked off. 800 ml of demineralized water are added to the resin, and the latter is washed over a sieve with demineralized water. 1480 ml of a strongly basic anion exchanger (mean particle size 550 μm) are obtained.

Total capacity: 1.37 mol/l

Example 11
Preparation of a Weakly Basic Anion Exchanger 210 ml of the chloromethylated bead polymer from Example 9 are initially introduced into a 3 l autoclave and the mother liquor is completely sucked off. 357 ml of demineralized water, 8.9 g of sodium chloride and 68 g of dimethylaminoethanol (99% strength) are then added while stirring. The reaction mixture is heated to 100° C., stirred for 7 hours at 100° C. and cooled to room temperature and the mother liquor is sucked off. 800 ml of demineralized water are added to the resin and the latter is washed over a sieve with demineralized water. 460 ml of weakly basic anion exchanger (mean particle size 550 μm) are obtained.

Total capacity: 1.31 mol/l

We claim:
1. Process for the preparation of crosslinked polymers by the seed/feed process, characterized in that the seed used is a microencapsulated crosslinked polymer.
2. Process according to claim 1, in which the polymer used as seed is a bead polymer.
3. Process according to claim 1, in which the polymer used as seed is a crosslinked styrene polymer.
4. Process according to claim 1, in which the polymer used as seed is a polymer crosslinked with divinylbenzene.
5. Process according to claim 1, in which the capsule wall material is based on gelatine.
6. Process according to claim 1, in which the feed monomers are fed in under polymerization conditions.
7. Process according to claim 1, in which first the seed is swollen with a mixture of monomer and polymerization initiator and then a second monomer without polymerization initiator is added under polymerization conditions.
8. Process for the preparation of ion exchangers by functionalization of the polymers obtainable by processes according to claims 1.

* * * * *